United States Patent
McDaniel

[15] 3,676,760
[45] July 11, 1972

[54] FEEDRATE CONTROL SYSTEM
[72] Inventor: George H. McDaniel, Northville, Mich.
[73] Assignee: The Bendix Corporation
[22] Filed: Aug. 5, 1970
[21] Appl. No.: 62,235

[52] U.S. Cl. .................................................318/571, 318/39
[51] Int. Cl. .........................................................G05b 19/24
[58] Field of Search ............................................318/571, 39

[56] References Cited
UNITED STATES PATENTS 3,267,344   8/1966   McDaniel .........................318/571 X
3,344,260   9/1967   Lukens ............................318/571 X Primary Examiner—T. E. Lynch
Attorney—William F. Thornton, McGlynn & Reising, Plante, Hartz, Smith and Thompson and McGlynn, Reising, Milton and Ethington

[57] ABSTRACT

A feedrate control system having an IPR capability including a spindle pulse transducer and three interpolators for override, feedrate, and axis command functions.

2 Claims, 1 Drawing Figure

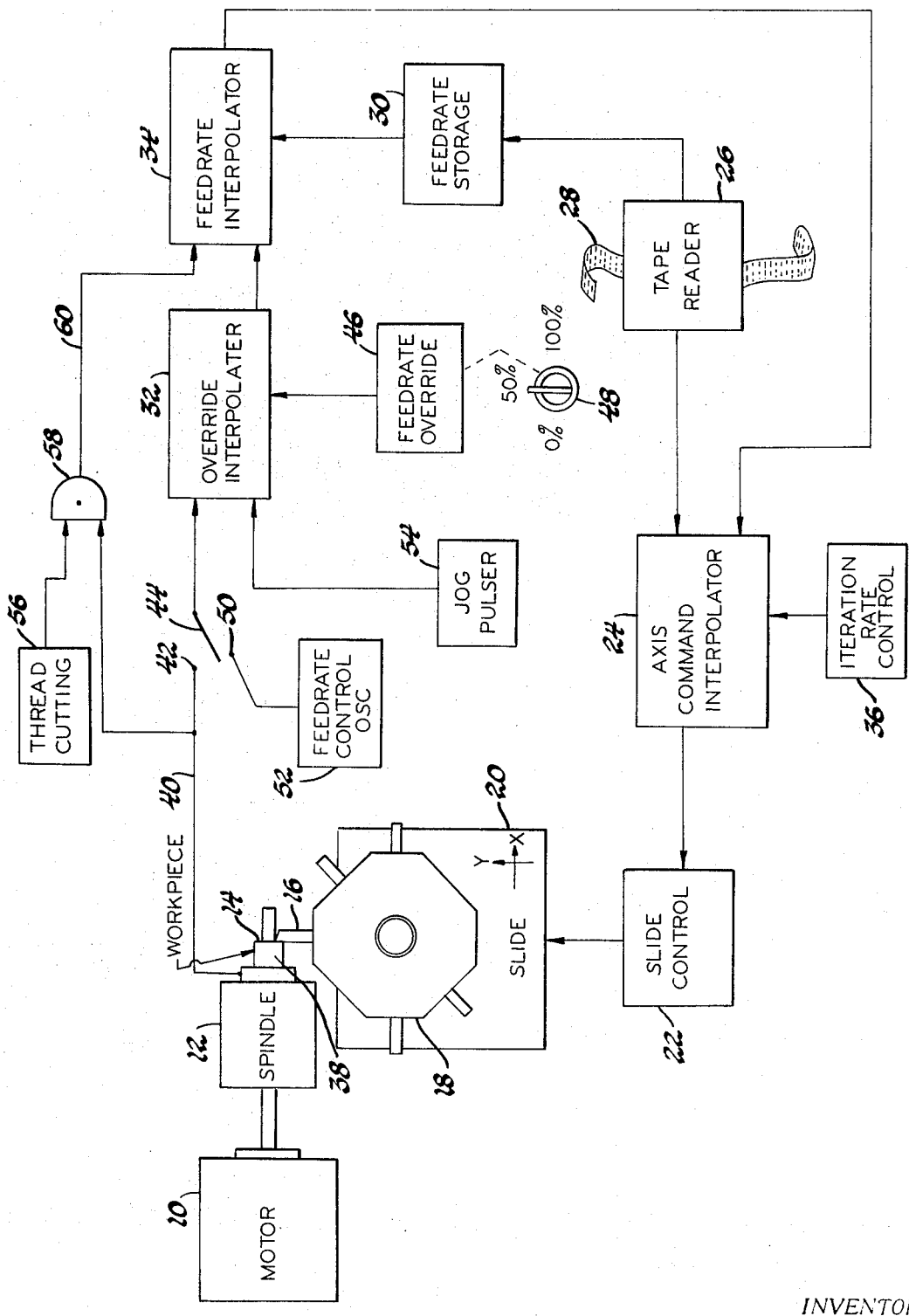

FEEDRATE CONTROL SYSTEM

This invention relates to numerical control systems for machine tools and particularly to an improved feedrate control arrangement for such systems.

In a numerical control system the movement of a tool relative to a workpiece is controlled by signals which are generated from data stored on tape or some other medium. This data, generally referred to as the part program, typically defines not only the desired path of movement for the tool, thus, defining the shape of the part to be machined, but also the rate at which the tool is moved relative to the part. Feedrate information is selected and programmed not only to maintain stress on the tool within limits but, as in the case of thread cutting, to also select the geometry of the machined part.

Feedrate is conventionally selected by placing a feedrate number (FRN) on the part program tape. This number is read from the tape and placed in an interpolator when is then iterated at a fixed rate to produce command pulses at a rate related to the FRN. For a typical operation, the operator must make certain preliminary calculations to determine the proper FRN to program. In the case of a tapered cut, these calculations involve the determinations of vector quantities which unless handled by a skilled operator, can lead to error. Such error usually results in diminished production, poor tool life and excessive scrap.

When operating in an inches per revolution (IPR) mode wherein feedrate is slaved to spindle speed, the iterations of the interpolators are paced not by an independent oscillator or clock, but by pulses from a spindle transducer. A spindle transducer is a device commonly known which generates a predetermined number of pulses for each spindle revolution. When operating in this IPR mode, a manual override is not generally possible in conventional systems since single pulses are fed directly to the axis interpolators to pace the iterations. This is generally satisfactory for thread cutting operations but is often inconvenient for other turning operations.

According to the present invention, a numerically controlled machine tool, such as a lathe, may be operated in an IPR mode with or without override of the part program feedrate number commands as well as in a thread cutting mode. In general, this is accomplished by first and second interpolators in addition to the axis interpolator, means for applying spindle transducer pulses and an override command to the first interpolator, means for alternatively applying spindle pulses and overflows from the first interpolator to the second interpolator along with a feedrate number, the overflows from the second interpolator being applied to the axis command interpolators to cause a total feedrate command which can be slaved to spindle speed but is subject to override in varying proportions.

In a preferred system, the present invention also permits the application of fixed rate pulses to the first interpolator rather than the spindle transducer pulses, thus to be capable of operation in a direct inches per minute (IPM) mode.

These and other advantages of the invention will become more apparent upon reading of the following specification which describes an illustrative embodiment of the invention and is to be taken with the single FIGURE of drawings which sets forth the illustrative embodiment of the invention in block diagram.

Referring to the single FIGURE, the numerically controlled machine tool system there illustrated is a two-axis lathe having a drive motor 10 connected to a spindle 12 which carries a workpiece 14. In the illustration the workpiece 14 is in the process of being shaped by a tool 16. The tool is carried by a turret 18 having various positions for other tools and being mounted on a machine slide 20. Slide 20 is subject to control along mutually perpendicular X and Y axes as indicated on the slide in the usual manner; i.e., slide 20 is mounted on ways on a tool body or carriage and subject to independent displacement along perpendicular axes by means of feedback-type control loops and jack screws or the like.

Displacement of the slide 20 along the X axis is controlled by the slide control unit 22 which receives command pulses from an axis command interpolator 24. Interpolator 24 receives input command signals from a tape reader 26 which reads a feedrate number from tape 28 in accordance with the part program. The FRN is read from tape 28 and placed in the buffer storage unit 30 from which it is fed to the second of two additional interpolators 32 and 34 to be described. The overflows from interpolator 34 are in turn applied to the axis command interpolator 24 which carries out iterations at a rate set by the iteration rate control unit 36.

In accordance with the invention, IPR control is accomplished by means of a spindle transducer 38 which produces pulses of a fixed number for each revolution of the spindle 12 and the workpiece 14. These pulses are applied by way of lines 40 to the first terminal 42 of a switch 44. Assuming switch 44 is in contact with terminal 42, the pulses are applied to one input of the override interpolator 32. Interpolator 32 produces output pulses at a rate normally controlled by the feedrate override selector 46 having a control knob 48 which is setable between zero and 100 percent positions. The feedrate override unit 46 places an effective feedrate number in the override interpolator 32 which is iterated at the rate of the spindle pulses from the transducer 38. The overflows from interpolator 32 are applied to the input of the feedrate interpolator 34 to cause iterations of the feedrate number received from the part program tape 28 through the feedrate storage unit 30. The overall output of the feedrate interpolator 34 is as previously described applied to the axis command interpolator 24.

Interpolators 24, 32 and 34 are all preferably conventional digital differential analyzers (DDA) which operate in a well-known manner to provide overflow pulses at a rate determined by length, a feedrate number stored therein, and the rate at which an iterative addition process of the feedrate number is caused to be carried out. Such digital differential analyzer type interpolators are more fully disclosed in the U.S. Pat. No. 3,128,374 to Ho et al. issued on Apr. 7, 1964.

The other terminal 50 of the switch 44 is connected to the output of a feedrate control oscillator 52 such that the switch 44 may be placed in one of two positions, the first position providing IPR operation, and the second position providing IPM operation. Override interpolator 32 is also connected to receive manually induced jog pulses 54 for causing movement of the slide 20 when the spindle 12 is not rotating.

For thread cutting operation the line 40 is connected in a bypass relationship to override interpolator 32 by way of an AND gate 58 having an output line 60 connected directly into the feedrate interpolator 34. Gate 58 is caused to be enabled by means of a low voltage thread cutting signal generator 56 which is turned on manually or from tape when a thread cutting operation is to be carried out. With the thread cutting signal generator 56 on, pulses from the spindle transducer 58 bypass the override interpolator 32 and are applied directly to the feedrate interpolator 34 to cause iterations of the FRN from the storage unit 30 in direct proportion to spindle revolutions.

OPERATION

Assuming a direct IPR operation is desired with available override, the pulses from spindle transducer 38 are applied through switch 44 to the override interpolator 32 to cause iterations of an effective FRN fed into the interpolator by means of the feedrate override selector 46. The resulting overflow is applied to the feedrate interpolator 34 to iterate the part program FRN at the rate the overflows occur. The resulting overflows from interpolator 34 are applied directly to the axis command interpolator 24, the overflows of which are applied directly to the slide control unit 22.

A specific numerical example is as follows: spindle transducer 38 produces 10,000 pulses per revolution of spindle 12. Feedrate override selector 36 is set at the 80 percent position. System resolution is 0.0001 inches per pulse. The programmed from part program tape 28 is 0.01 inches per revolution. The spindle speed is 500 revolutions per minute; therefore, the spindle pulse rate is 5 million pulses per minute. The override interpolator 32 produces an output of 80 percent of the spindle pulse rate of 4 million pulses per minute. The output of the feedrate interpolator 34 is 4 million pulses per minute multiplied by 0.01 inches per revolution or 40,000 pulses per minute. Thus, the vector feedrate in inches per minute is 40,000 pulses per minute multiplied by the system resolution of 0.0001 or 4 inches per minute.

The system illustrated can be used as a direct IPM system by throwing the switch 44 from terminal 42 to terminal 50. The feedrate control oscillator 52 produces pulses at a rate of 100 inches per minute to permit the feedrate to be programmed directly in inches per minute with a range of from 0.01 to 99.99 inches per minute.

It is to be understood that the foregoing description is illustrative in character and is not to be construed in a limiting sense.

The embodiments of the invention in which an exclusive property or privilege is claimed are defined as follows:

1. A feedrate control system for numerically controlled machine tools comprising: a tool having a rotatable spindle, means for producing a fixed number of pulses for each rotation of the spingle, switch means having first and second positions, a first interpolator connected through said switch means when in a first position to receive the spindle pulses and to iterate a selected override quantity at the spindle pulse rate; a feedrate control signal source, said first interpolator being connected through said switch means when in said second position to iterate said override quantity at a fixed rate, an override selector means connected to the first interpolator for providing said override quantity, a second interpolator connected to receive a part program feedrate number and being further connected to iterate said number at the rate overflows occur from the first interpolator, and an axis command interpolator connected to receive the overflows from the second interpolator and to iterate a predetermined number placed therein at the rate said overflows occur, the output of the axis command interpolator being connected directly to control the rate at which a machine tool is moved relative to the spindle.

2. The apparatus described in claim 1 and including means for bypassing the first interpolator and applying said spindle pulses directly to the second interpolator for thread cutting purposes.

* * * * *